United States Patent
Zhao et al.

(10) Patent No.: US 12,254,323 B2
(45) Date of Patent: Mar. 18, 2025

(54) DEPLOYMENT METHOD FOR BOOTING SEQUENCE OF MULTIPLE OPERATING SYSTEMS AND RELATED APPARATUS

(71) Applicant: SUZHOU METABRAIN INTELLIGENT TECHNOLOGY CO., LTD., Jiangsu (CN)

(72) Inventors: Tianzhi Zhao, Jiangsu (CN); Chuanbo Yuan, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/723,042

(22) PCT Filed: Apr. 25, 2023

(86) PCT No.: PCT/CN2023/090613
§ 371 (c)(1),
(2) Date: Jun. 21, 2024

(87) PCT Pub. No.: WO2023/207987
PCT Pub. Date: Nov. 2, 2023

(65) Prior Publication Data
US 2024/0419453 A1    Dec. 19, 2024

(30) Foreign Application Priority Data
Apr. 25, 2022   (CN) .................. 202210436732.X (51) Int. Cl.
*G06F 9/4401* (2018.01)

(52) U.S. Cl.
CPC .................. *G06F 9/441* (2013.01)

(58) Field of Classification Search
CPC ....... G06F 9/441; G06F 9/4416; G06F 3/0689
See application file for complete search history.

(56) References Cited

U.S. PATENT DOCUMENTS

| | | |
|---|---|---|
| 2006/0064576 A1 | 3/2006 | Chen |
| 2006/0168440 A1* | 7/2006 | Huang .................. G06F 9/441 |
| | | 713/2 |

(Continued)

FOREIGN PATENT DOCUMENTS

| | | |
|---|---|---|
| CN | 103049352 A | 4/2013 |
| CN | 103605536 A | 2/2014 |

(Continued)

*Primary Examiner* — Jaweed A Abbaszadeh
*Assistant Examiner* — Hyun Soo Kim
(74) *Attorney, Agent, or Firm* — IPro PLLC (57) ABSTRACT

A deployment method for a booting sequence of multiple operating systems and related apparatus, related to the technical field of computers and applied to a baseboard management controller (BMC), include: establishing a connection to a disk array (S101); receiving first target logical disk information, wherein the first target logical disk information is information of logical disks provided with to-be-booted operating systems (S102); sending the first target logical disk information to the disk array (S103); and receiving booting flag setting information of the disk array, wherein the booting flag setting information is completion information sent after the disk array sets booting flags for corresponding logical disks based on the first target logical disk information (S104).

18 Claims, 3 Drawing Sheets

(56) References Cited

U.S. PATENT DOCUMENTS

| | | | |
|---|---|---|---|
| 2006/0282652 A1* | 12/2006 | El-Haj-mahmoud | ............... G06F 9/4408 713/1 |
| 2008/0155243 A1* | 6/2008 | Diep | ............... G06F 9/45558 713/2 |
| 2011/0113227 A1* | 5/2011 | Lu | ............... G06F 9/4408 713/2 |
| 2014/0156982 A1* | 6/2014 | Hamid | ............... G06F 9/441 713/2 |
| 2016/0203000 A1* | 7/2016 | Parmar | ............... H04L 67/34 713/2 |
| 2017/0109176 A1* | 4/2017 | Shih | ............... G06F 9/4406 |
| 2018/0088962 A1 | 3/2018 | Balakrishnan et al. | |
| 2021/0365270 A1 | 11/2021 | Yu et al. | |

FOREIGN PATENT DOCUMENTS

| | | |
|---|---|---|
| CN | 112860330 A | 5/2021 |
| CN | 114327733 A | 4/2022 |
| CN | 114546537 A | 5/2022 |
| CN | 115167930 A | 10/2022 |

* cited by examiner

DEPLOYMENT METHOD FOR BOOTING SEQUENCE OF MULTIPLE OPERATING SYSTEMS AND RELATED APPARATUS

CROSS-REFERENCE TO RELATED APPLICATION

This application claims the priority of the Chinese Patent application filed on Apr. 25, 2022 before the China National Intellectual Property Administration with the application number of 202210436732.X, and the title of "DEPLOYMENT METHOD FOR BOOTING SEQUENCE OF MULTIPLE OPERATING SYSTEMS AND RELATED APPARATUS", which is incorporated herein in its entirety by reference.

FIELD

The present application relates to the technical field of computers and, more particularly, to a deployment method and apparatus for a booting sequence of multiple operating systems, a terminal device, and a non-transitory readable storage medium.

BACKGROUND

With gradual advancement of informatization, multiple operating systems are required for a same server to meet the regulation of different software and hardware. In other words, multiple operating systems are installed in a same device, so that an appropriate operating system is selected at the right time.

In the prior art, when operating between different operating systems, technicians or users need to enter a cumbersome setup interface to switch the systems, which reduces the switching efficiency and also results in subjective errors of manual switching and operation switching errors.

SUMMARY

An object of the present application is to provide a deployment method and apparatus for a booting sequence of multiple operating systems, a terminal device, and a non-transitory readable storage medium to improve the efficiency of deploying the booting sequence of the multiple operating systems and avoid repeated and cumbersome operations.

In order to solve the technical problem stated above, a deployment method for a booting sequence of multiple operating systems is provided by the present application, which is applied to a baseboard management controller (BMC) and includes:
  establishing a connection to a disk array;
  receiving first target logical disk information, wherein the first target logical disk information is information of logical disks provided with to-be-booted operating systems;
  sending the first target logical disk information to the disk array; and
  receiving booting flag setting information of the disk array, wherein the booting flag setting information is completion information sent after the disk array sets booting flags for corresponding logical disks based on the first target logical disk information.

In some embodiments, the deployment method further includes:
  adjusting, by a basic input output system (BIOS), the booting sequence of the multiple operating systems based on the booting flags when the BIOS is rebooted.

In some embodiments, the deployment method further includes:
  adjusting, by a BIOS, the booting sequence of the multiple operating systems based on the booting flags during a booting process.

In some embodiments, adjusting, by the BIOS, the booting sequence of the multiple operating systems based on the booting flags when the BIOS is rebooted includes:
  addressing, by the BIOS, a firmware address of the disk array when the BIOS is rebooted;
  acquiring an automatic flag in a firmware code when addressing is successful; and
  adjusting the booting sequence of the multiple operating systems based on the booting flags.

In some embodiments, the deployment method further includes:
  loading, by a central processing unit (CPU), instructions of the BIOS one by one when the BIOS is rebooted.

In some embodiments, addressing, by the BIOS, the firmware address of the disk array includes:
  addressing, by the BIOS, a read-only memory (ROM) address of the disk array on a bus.

In some embodiments, establishing the connection to the disk array includes:
  determining, by the BMC, whether a firmware system of the disk array has completed loading when a BIOS has completed loading; and
  in response to that the firmware system of the disk array has completed loading, establishing, by the BMC, the connection to the disk array.

In some embodiments, the deployment method further includes:
  determining that the BIOS has completed loading when the BIOS has completed self-test.

In some embodiments, after establishing, by the BMC, the connection to the disk array, the deployment method further includes:
  acquiring, by the BMC, information of the disk array, physical disk information, and logical disk information; and
  displaying an operation interface according to the information of the disk array, the physical disk information, and the logical disk information, and acquiring a logical unit number (LUN) of each logical disk, so that a user inputs the first target logical disk information based on a display content of the operation interface.

In some embodiments, the deployment method further includes:
  acquiring second target logical disk information recommended based on a collaborative filtering algorithm, so that the disk array sets the booting flags for the corresponding logical disks based on the second target logical disk information.

In some embodiments, acquiring the second target logical disk information recommended based on the collaborative filtering algorithm includes:
  in response to that an automatic system switching function of the BMC is enabled, acquiring the second target logical disk information recommended based on the collaborative filtering algorithm.

In some embodiments, acquiring the second target logical disk information recommended based on the collaborative filtering algorithm includes:

acquiring a system switching frequency and operation time; and processing the system switching frequency and the operation time based on a collaborative filtering recommendation algorithm to obtain the second target logical disk information.

In some embodiments, the deployment method further includes:

in response to that an automatic system switching function of the BMC is enabled, acquiring a switching frequency and a switching time period for switching to a target operating system within a preset time period; and generating a recommendation index of the target operating system at a target time node based on a system type of the target operating system, the switching frequency, and the switching time period.

In some embodiments, generating the recommendation index of the target operating system at the target time node based on the system type of the target operating system, the switching frequency, and the switching time period includes:

generating a three-dimensional matrix based on the system type of the target operating system, the switching frequency, and the switching time period; and calculating the three-dimensional matrix through the collaborative filtering algorithm to obtain the recommendation index of the target operating system at the target time node.

In some embodiments, systems to be booted next time are installed in the logical disks corresponding to the first target logical disk information.

A deployment method for a booting sequence of multiple operating systems is further provided by the present application, which is applied to a disk array and includes:

establishing a connection to a baseboard management controller (BMC);

receiving first target logical disk information sent by the BMC, wherein the first target logical disk information is information of logical disks provided with to-be-booted operating systems; and setting booting flags for corresponding logical disks based on the first target logical disk information, and sending booting flag setting information to the BMC.

A deployment apparatus for a booting sequence of multiple operating systems is further provided by the present application, which includes:

a connection establishment module, configured to establish a connection to a disk array;

a logical disk information receiving module, configured to receive first target logical disk information, wherein the first target logical disk information is information of logical disks provided with to-be-booted operating systems;

a logical disk information sending module, configured to send the first target logical disk information to the disk array; and a setting information receiving module, configured to receive booting flag setting information of the disk array, wherein the booting flag setting information is completion information sent after the disk array sets booting flags for corresponding logical disks based on the first target logical disk information.

A deployment apparatus for a booting sequence of multiple operating systems is further provided by the present application, which is applied to a disk array and includes:

a second connection establishment module, configured to establish a connection to a baseboard management controller (BMC);

a second logical disk information receiving module, configured to receive first target logical disk information sent by the BMC, wherein the first target logical disk information is information of logical disks provided with to-be-booted operating systems; and a setting information receiving module, configured to set booting flags for corresponding logical disks based on the first target logical disk information, and send booting flag setting information to the BMC.

A terminal device is further provided by the present application, which includes:

a memory, configured to store a computer program; and a processor, configured to implement, when executing the computer program, the steps of the deployment method for the booting sequence as stated above.

A non-transitory readable storage medium storing a computer program is further provided by the present application, wherein the computer program, when executed by a processor, implements the steps of the deployment method for the booting sequence as stated above.

A deployment method for the booting sequence of multiple operating systems provided by the present application is applied to a baseboard management controller (BMC) and includes: establishing a connection to a disk array; receiving first target logical disk information, wherein the first target logical disk information is information of logical disks provided with to-be-booted operating systems; sending the first target logical disk information to the disk array; and receiving booting flag setting information of the disk array, wherein the booting flag setting information is completion information sent after the disk array sets booting flags for corresponding logical disks based on the first target logical disk information.

By that the BMC establishes a connection to a disk array, and then, when target logical disk information is acquired, the target logical disk information is sent to the disk array, so that the disk array sets corresponding booting flags for corresponding logical disks based on the target logical disk information, it is realized that the booting sequence of the multiple operating systems is adjusted based on the BMC, rather than that the booting sequence is manually adjusted in a booting interface, and the switching efficiency of the operating systems is improved.

A deployment apparatus for a booting sequence of multiple operating systems, a terminal device, and a non-transitory readable storage medium are also provided by the present application, which have the above beneficial effects and will not be described in detail herein.

BRIEF DESCRIPTION OF THE DRAWINGS

In order to explain the embodiments of the present application or the technical solutions in the prior art more clearly, a brief description will be given below with reference to the accompanying drawings which are used in the description of the embodiments or the prior art. It is obvious that the drawings in the description below are merely some embodiments of the present application, and a person skilled in the art may obtain other drawings according to the provided drawings without involving any creative effort.

DETAILED DESCRIPTION

The core of the present application is to provide a deployment method and apparatus for a booting sequence of multiple operating systems, a terminal device, and a non-transitory readable storage medium to improve the efficiency of deploying the booting sequence of operation systems and avoid repeated and cumbersome operations.

In order that the objects, technical solutions, and advantages of the embodiments of the present application become more apparent, the technical solutions in the embodiments of the present application will now be described clearly and completely with reference to the accompanying drawings in the embodiments of the present application. It is obvious that the described embodiments are merely some, but not all, embodiments of the present application. Based on the embodiments of the present application, all other embodiments obtained by a person skilled in the art without involving any creative effort shall fall within the scope of protection of the present application.

In the prior art, when operating between different operating systems, technicians or users need to enter a cumbersome setup interface to switch the systems, which reduces the switching efficiency and also results in subjective errors of manual switching and operation switching errors.

Therefore, the present application provides a deployment method for a booting sequence of multiple operating systems. By that the BMC establishes a connection to a disk array, and then, when target logical disk information is acquired, the target logical disk information is sent to the disk array, so that the disk array sets corresponding booting flags for corresponding logical disks based on the target logical disk information, it is realized that the booting sequence of the multiple operating systems is adjusted based on the BMC, rather than that the booting sequence is manually adjusted in a booting interface, and the switching efficiency of the operating systems is improved.

The deployment method for the booting sequence of the multiple operating systems provided by the present application is illustrated below through one embodiment.

Figure 1:
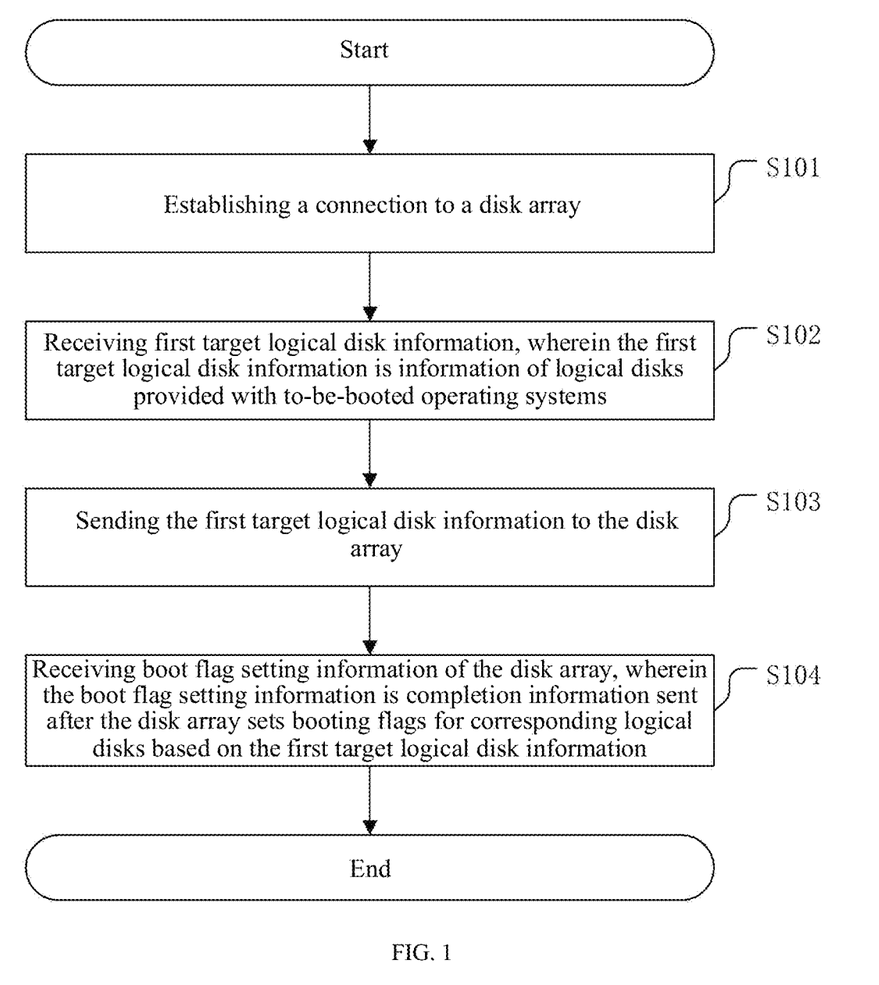
FIG. 1 is a flow chart of a deployment method for a booting sequence of multiple operating systems according to an embodiment of the present application.

Reference is made to FIG. 1. FIG. 1 is a flow chart of a deployment method for a booting sequence of multiple operating systems according to an embodiment of the present application.

In this embodiment, the method may include:

S101, establishing a connection to a disk array.

It may be seen that a connection is mainly established between a BMC and the disk array in this step. In other words, after the BMC is connected to the disk array, the BMC may directly send information to the disk array, so that the disk array makes corresponding settings based on the received information.

Further, this step may include:

Step 1, determining, by the BMC, whether a firmware system of the disk array has completed loading when a basic input output system (BIOS) has completed loading.

Step 2, in response to that that the firmware system of the disk array has completed loading, establishing, by the BMC, the connection to the disk array.

It may be seen that in some embodiments, it is mainly illustrated how the BMC is connected to the disk array. In some embodiments, the BMC determines whether the firmware system of the disk array has completed loading when the BIOS has completed loading. In other words, the BMC may determine whether the firmware system of the disk array has completed loading when the BIOS has completed loading. The firmware system in the disk array is a system program of the disk array itself, and the firmware system may operate the disk array. When the firmware system has completed loading, the BMC establishes a connection to the disk array. In other words, the connection is realized, thereby the efficiency of connection establishment is improved.

In some embodiments of the present application, the BIOS may be self-tested during booting or rebooting, and it is determined that the BIOS has completed loading after the BIOS has completed self-test, and other instructions may be performed.

Further, based on the previous alternative solution, the deployment method may further include:

Step 1, acquiring, by the BMC, information of the disk array, physical disk information, and logical disk information.

Step 2, displaying an operation interface according to the information of the disk array, the physical disk information, and the logical disk information, and acquiring a logical unit number (LUN) of each logical disk, so that a user inputs the first target logical disk information based on a display content of the operation interface.

It may be seen that in some embodiments, it is mainly illustrated that the operation interface needs to be displayed after the BMC establishes the connection to the disk array. In some embodiments, the BMC acquires the information of the disk array, the physical disk information, and the logical disk information, displays the operation interface according to the information of the disk array, the physical disk information, and the logical disk information, and acquires the logical unit number of each logical disk, so that the user inputs the first target logical disk information based on the display content of the operation interface. In other words, when the user refers to the content displayed in the operation interface, each logical disk in the current system may be intuitively viewed and selected quickly, thereby the efficiency of selecting the first target logical disk information is improved.

S102, receiving first target logical disk information, wherein the first target logical disk information is information of logical disks provided with to-be-booted operating systems.

Based on S101, this step is intended to receive the first target logical disk information, wherein the first target logical disk information is the information of the logical disks provided with the to-be-booted operating systems. In other words, the BMC receives logical disk information required to be set, namely receives the first target logical disk information. The first target logical disk information is the information of the logical disks provided with the to-be-booted operating systems. In other words, systems to be booted next time are installed in the logical disks corresponding to the first target logical disk information.

S103, sending the first target logical disk information to the disk array.

Based on S102, this step is intended to send the first target logical disk information to the disk array. In other words, the disk array is informed of which logical disk is required to be set.

S104, receiving booting flag setting information of the disk array, wherein the booting flag setting information is completion information sent after the disk array sets booting flags for the corresponding logical disks based on the first target logical disk information.

Based on S103, this step is intended to receive the booting flag setting information of the disk array, wherein the booting flag setting information is the completion information sent after the disk array sets the booting flags for the corresponding logical disks based on the first target logical disk information.

In other words, when receiving the first target logical disk information, the disk array sets the booting flags for the corresponding logical disks based on the first target logical disk information. When the booting flags are successfully set for the logical disks, the booting flag setting information is sent to the BMC, so that the BMC is informed of successful setting.

Wherein the set booting flags are to illustrate that a system of the current logical disk is a logical disk to be booted next time.

Further, this embodiment may further include:
adjusting, by the BIOS, the booting sequence of the multiple operating systems based on the booting flags when the BIOS is rebooted.

It may be seen that in some embodiments, it is mainly illustrated how the booting sequence is adjusted. In some embodiments, the BIOS adjusts the booting sequence of the multiple operating systems based on the booting flags when the BIOS is rebooted, so that the booting sequence may be set is realized, systems to be booted next time are efficiently set.

In some embodiments of the present application, the BIOS may also adjust the booting sequence of the multiple operating systems based on the booting flags during a booting process.

Further, the process in the previous alternative solution may include:
Step 1, addressing, by the BIOS, a firmware address of the disk array when the BIOS is rebooted.
Step 2, acquiring an automatic flag in a firmware code when addressing is successful.
Step 3, adjusting the booting sequence of the multiple operating systems based on the booting flags.

It may be seen that in some embodiments, it is mainly illustrated how the booting sequence is adjusted. In some embodiments, the BIOS addresses the firmware address of the disk array when the BIOS is rebooted, acquires the automatic flag in the firmware code when the addressing is successful, and adjusts the booting sequence of the multiple operating systems based on the booting flags, so that the efficiency of setting the booting sequence of the systems is improved and automatic setting rather than manual setting is realized.

In some embodiments of the present application, a central processing unit (CPU) may load instructions of the BIOS one by one when the BIOS is rebooted. The BIOS may further address the firmware address of the disk array on a bus. The BIOS may address a read-only memory (ROM) address.

Further, in this embodiment, in order to improve the efficiency of deployment of the booting sequence to realize an automatic deployment process, the deployment method may further include:
acquiring second target logical disk information recommended based on a collaborative filtering algorithm, so that the disk array sets booting flags for the corresponding logical disks based on the second target logical disk information.

It may be seen that in some embodiments, it is mainly illustrated that the corresponding target logical disk information may be automatically recommended. In some embodiments, the second target logical disk information recommended based on the collaborative filtering algorithm is acquired, so that the disk array sets the booting flags for the corresponding logical disks based on the second target logical disk information, so that the efficiency of setting the booting sequence of the systems is improved and automatic setting rather than manual setting is realized.

In some embodiments of the present application, an automatic system switching function may be disposed in the BMC to achieve automatic recommendation. The second target logical disk information recommended based on the collaborative filtering algorithm may be acquired under the condition that the automatic system switching function of the BMC is enabled. The second target logical disk information is logical disk information corresponding to a switched target operating system.

Further, "acquiring the second target logical disk information recommended based on the collaborative filtering algorithm" in the previous alternative solution may include:
Step 1, acquiring a system switching frequency and operation time.
Step 2, processing the system switching frequency and the operation time based on a collaborative filtering recommendation algorithm to obtain the second target logical disk information.

It may be seen that in some embodiments, it is mainly illustrated how the second target logical disk information is acquired. In some embodiments, the system switching frequency and the operation time are acquired, and the system switching frequency and the operation time are processed based on the collaborative filtering recommendation algorithm to obtain the second target logical disk information, so that the corresponding logical disk information is recommended based on the system switching frequency and the operation time without manual setting, and the efficiency of setting is improved.

In some embodiments of the present application, the recommendation index corresponding to each operating system may be determined by statistically calculating switching states within a period of time, and then a matched operating system may be determined according to the state of the current system when an automatic recommendation function is enabled.

In some embodiments, a switching frequency and a switching time period for switching to a target operating system within a preset time period may be acquired under the condition that the automatic system switching function of the BMC is enabled, and a recommendation index of the target operating system at a target time node is generated based on a system type of the target operating system, the switching frequency, and the switching time period.

Further, generating the recommendation index of the target operating system at the target time node based on the system type of the target operating system, the switching frequency, and the switching time period includes: generating a three-dimensional matrix based on the system type of the target operating system, the switching frequency, and the switching time period, and calculating the three-dimensional matrix through the collaborative filtering algorithm to obtain the recommendation index of the target operating system at the target time node.

In conclusion, in this embodiment, by that the BMC establishes a connection to the disk array, and then, when the target logical disk information is acquired, the target logical disk information is sent to the disk array, so that the disk array sets corresponding booting flags for corresponding logical disks based on the target logical disk information, it is realized that the booting sequence of multiple operating systems is adjusted based on the BMC, rather than that the booting sequence is manually adjusted in a booting interface, and the switching efficiency of the operating systems is improved.

The deployment method for the booting sequence of multiple operating systems provided in the present application is further illustrated below through another embodiment.

Figure 2:
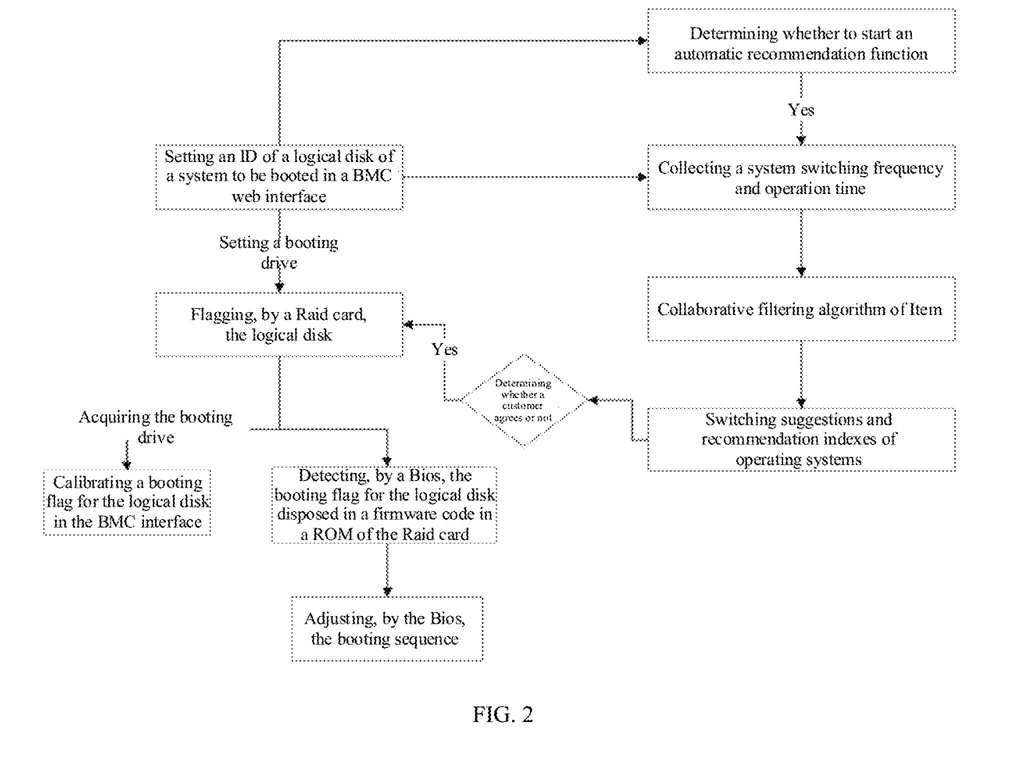
FIG. 2 is a flow chart of another deployment method for a booting sequence of multiple operating systems according to an embodiment of the present application.

Reference is made to FIG. 2. FIG. 2 is a flow chart of another deployment method for the booting sequence of multiple operating systems according to an embodiment of the present application.

In this embodiment, the method may include:

S201, after a BIOS has completed self-test, waiting for loading completion of a firmware system of a redundant array of independent disks (RAID) card, establishing communication between a BMC and the RAID card, acquiring the RAID card and information of the managed physical disk and logical disk, and being capable of setting the firmware system of the RAID card.

S202, acquiring a logical unit number (LUN) of each logical disk after creating a plurality of logical disks in a visualized "storage" Web (World Wide Web) interface of the BMC, specifying an operating system carried by the logical disk corresponding to one of the LUNs as a target to be booted next time, and sending the LUN to the RAID through the "storage" Web interface of the BMC to enable a set booting drive function (set boot drive) of the logical disk. After the setting is successful, the BMC will receive a successfully set field (get boot drive) returned by the RAID card, and the specified logical disk will have a booting flag.

S203, flagging, by firmware of the RAID, a booting option of the corresponding logical disk after the BMC sends the LUN to the RAID. When rebooting or booting the BIOS, a CPU will load instructions in the BIOS one by one, and finally address a ROM address on the RAID card on a bus to acquire a flag of a booting option on a firmware code in a ROM. The BIOS may adjust the booting sequence of current operating systems according to the flag of the booting option, and switching of the systems is realized.

S204, when an automatic system switching function provided by the BMC is enabled, forming a three-dimensional matrix composed of a system type, a switching frequency, and a switching time according to a frequency of switching a certain operating system and a switching time period recorded over a period of time, and calculating a recommendation index of a certain system at a certain time point by using a collaborative filtering algorithm of Item.

Further, an automatic recommendation function (automatic system switching function) in S204 is enabled according to own actual requirements.

It may be seen that in this embodiment, the BMC establishes the connection to the disk array, and then, when target logical disk information is acquired, the target logical disk information is sent to the disk array, so that the disk array sets corresponding booting flags for corresponding logical disks based on the target logical disk information, it is realized that the booting sequence of multiple operating systems is adjusted based on the BMC, rather than that the booting sequence is manually adjusted in a booting interface, and the switching efficiency of the operating systems is improved.

The deployment method for the booting sequence of multiple operating systems provided in the present application is illustrated below from the perspective of hardware through another embodiment.

This embodiment is executed in a terminal device such as a server. The terminal device includes a BMC, a BIOS, and a disk array.

Further, the deployment method for the booting sequence may include:

establishing a connection between a BMC and a disk array, and receiving first target logical disk information, wherein the first target logical disk information is information of logical disks provided with to-be-booted operating systems;

sending, by the BMC, the first target logical disk information to the disk array;

setting, by the disk array, corresponding booting flags for the corresponding logical disks based on the received first target logical disk information, and sending booting flag setting information to the BMC after the setting is completed;

receiving, by the BMC, the booting flag setting information of the disk array; and adjusting, by a BIOS, the booting sequence of the multiple operating systems based on the booting flags when the BIOS is rebooted.

It may be seen that in this embodiment, the BMC establishes the connection to the disk array, and then, when target logical disk information is acquired, the target logical disk information is sent to the disk array, so that the disk array sets corresponding booting flags for corresponding logical disks based on the target logical disk information, it is realized that the booting sequence of multiple operating systems is adjusted based on the BMC, rather than that the booting sequence is manually adjusted in a booting interface, and the switching efficiency of the operating systems is improved.

A deployment apparatus for a booting sequence of multiple operating systems according to an embodiment of the present application will be described below. The deployment apparatus for the booting sequence of the multiple operating systems described below and the deployment method for the booting sequence of the multiple operating systems described above may be referred to in correspondence with each other.

Figure 3:
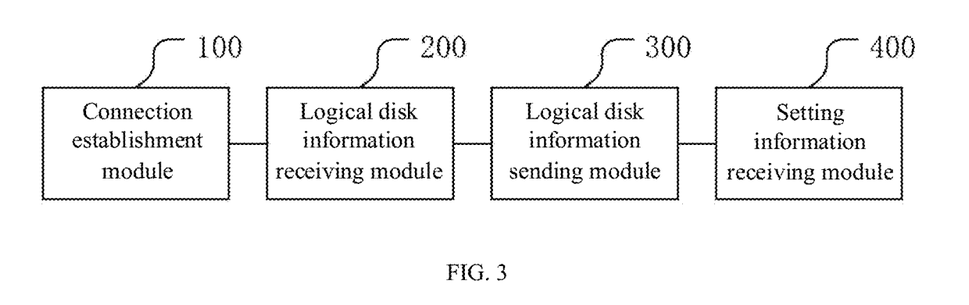
FIG. 3 is a schematic diagram of a structure of a deployment apparatus for a booting sequence of multiple operating systems according to an embodiment of the present application.

Reference is made to FIG. 3. FIG. 3 is a schematic diagram of a structure of a deployment apparatus for booting sequence of multiple operating systems according to an embodiment of the present application.

In this embodiment, the apparatus may include:

a connection establishment module 100, configured to establish a connection to a disk array;

a logical disk information receiving module 200, configured to receive first target logical disk information, wherein the first target logical disk information is information of logical disks provided with to-be-booted operating systems;

a logical disk information sending module 300, configured to send the first target logical disk information to the disk array; and a setting information receiving module 400, configured to receive booting flag setting information of the disk array, wherein the booting flag setting information is completion information sent after the disk array sets booting flags for the corresponding logical disks based on the first target logical disk information.

In some embodiments, the apparatus may further include:

a sequence adjustment module, configured to adjust the booting sequence of the multiple operating systems based on the booting flags when a BIOS is rebooted.

In some embodiments, the sequence adjustment module is configured to: address a firmware address of the disk array when the BIOS is rebooted; acquire an automatic flag in a firmware code when addressing is successful; and adjust the booting sequence of the multiple operating systems based on the booting flags.

In some embodiments, the connection establishment module 100 is configured to: determine, by the BMC, whether a firmware system of the disk array has completed loading when the BIOS has completed loading; and in response to that the firmware system of the disk array has completed loading, establish, by the BMC, the connection to the disk array.

In some embodiments, the apparatus may further include:

an operation interface display module, configured to: acquire information of the disk array, physical disk information, and logical disk information; and display an operation interface according to the information of the disk array, the physical disk information, and the logical disk information, and acquire a LUN of each logical disk, so that a user inputs the first target logical disk information based on a display content of the operation interface.

In some embodiments, the apparatus may further include:

a recommendation module, configured to acquire second target logical disk information recommended based on a collaborative filtering algorithm, so that the disk array sets booting flags for the corresponding logical disks based on the second target logical disk information.

In some embodiments, the recommendation module is configured to: acquire a system switching frequency and operation time; and process the system switching frequency and the operation time based on a collaborative filtering recommendation algorithm to obtain the second target logical disk information.

Figure 4:
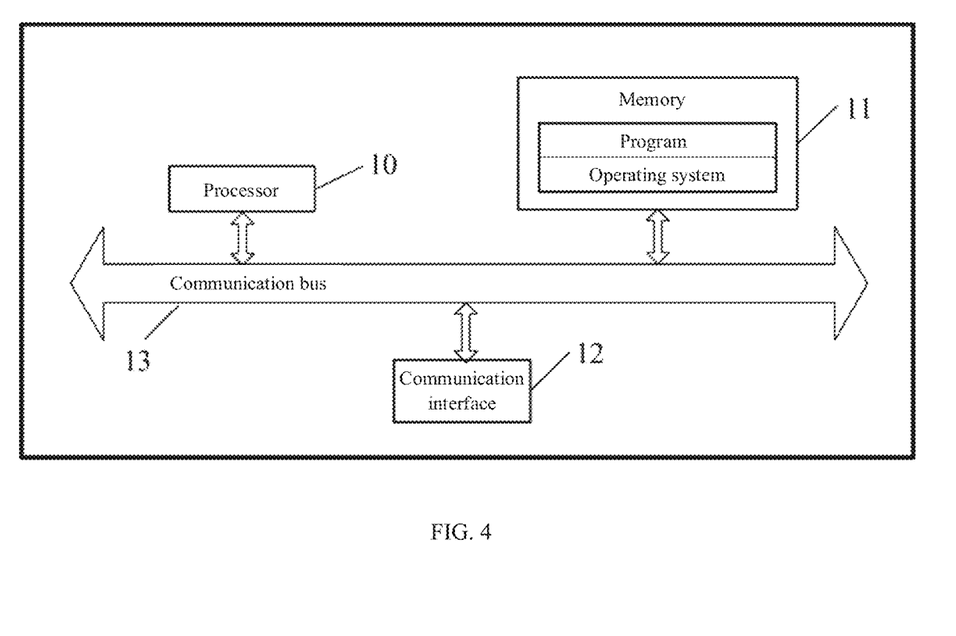
FIG. 4 is a schematic diagram of a structure of a terminal device according to an embodiment of the present application.

A terminal device is also provided by the present application. Reference is made to FIG. 4. FIG. 4 is a schematic diagram of a structure of a terminal device according to an embodiment of the present application. The terminal device may include:

a memory, configured to store a computer program; and a processor, configured to implement, when executing the computer program, the steps of any one of the above-mentioned deployment methods for the booting sequence.

FIG. 4 shows a schematic diagram of a composition structure of a terminal device. The terminal device may include a processor 10, a memory 11, a communication interface 12, and a communication bus 13. The processor 10, the memory 11, and the communication interface 12 all communicate with each other through the communication bus 13.

In an embodiment of the present application, the processor 10 may be a CPU, an application-specific integrated circuit, a digital signal processor, a field programmable gate array, or other programmable logical devices.

The processor 10 may invoke a program stored in the memory 11. In some embodiments, the processor 10 may perform operations in an embodiment of a deployment method for the booting sequence.

The memory 11 is configured to store one or more programs. The program may include program codes, and the program codes include computer operation instructions. In an embodiment of the present application, the memory 11 stores at least a program for realizing the following functions:

establishing a connection to a disk array;

receiving first target logical disk information, wherein the first target logical disk information is information of logical disks provided with to-be-booted operating systems;

sending the first target logical disk information to the disk array; and receiving booting flag setting information of the disk array, wherein the booting flag setting information is completion information sent after the disk array sets booting flags for the corresponding logical disks based on the first target logical disk information.

In a possible implementation, the memory 11 may include a stored program area and a stored data area. The stored program area may store an operating system, an application program required for at least one function, and the like. The stored data area may store data created during use.

Furthermore, the memory 11 may include a high-speed random access memory and may also include a non-transitory memory, such as at least one disk memory device or another transitory solid-state memory device.

The communication interface 12 may be an interface of a communication module for connection to other devices or systems.

Certainly, it should be noted that the structure shown in FIG. 4 does not constitute a limitation on the terminal device in the embodiment of the present application. In practical applications, the terminal device may include more or fewer components than that shown in FIG. 4, or may combine certain components.

A non-transitory readable storage medium is also provided by the present application. The non-transitory readable storage medium stores a computer program. The computer program, when executed by a processor, may implement the steps of any one of the above-mentioned deployment methods for the booting sequence.

The non-transitory readable storage medium may include: a USB flash drive, a removable hard disk, a ROM, a random access memory (RAM), a magnetic disk, or an optical disk, and other media which may store program codes.

The non-transitory readable storage medium provided in the present application may be introduced with reference to the above-mentioned method embodiment. Details are not described herein in the present application.

Various embodiments are described in the specification in a progressive manner. Each embodiment focuses on differences from the other embodiments. The same or similar parts of the various embodiments may be referred to each other. As to the apparatus disclosed by the embodiments, since the apparatus corresponds to the method disclosed by the embodiments, the description is relatively simple. The relevant part may be described with reference to the method section.

Professionals may further appreciate that the units and algorithmic steps of each example described in conjunction with the embodiments disclosed herein may be implemented in electronic hardware, computer software, or a combination of both, and that the composition and steps of each example have been described functionally in general in the above-mentioned description in order to clearly illustrate the interchangeability of hardware and software. Whether these functions are performed in hardware or software depends on the application and design constraints of the technical solution. Professionals may implement the described functions using different methods for each particular application, but such an implementation should not be considered outside the scope of the present application.

The steps of the methods or algorithms described in conjunction with the embodiments disclosed herein may be implemented directly with hardware, processor-executed software modules, or a combination of both. The software modules may be placed in a RAM, an internal memory, a ROM, an electrically programmable ROM, an electrically erasable programmable ROM, a register, a hard disk, a removable disk, a compact disc read-only memory (CD-ROM), or any other form of storage medium known in the art.

The deployment method and apparatus for the booting sequence of the multiple operating systems, the terminal device, and the non-transitory readable storage medium provided in the present application have been described in detail above. The principles and implementations of the present application have been set forth herein using examples. The above embodiments have been set forth only to aid in the understanding of the method and core ideas of the present application. It should be noted that a person of ordinary skill in the art may make numerous improvements and modifications to the present application without departing from the principles of the present application. Such improvements and modifications are intended to be within the scope of protection of the appended claims of the present application.

The invention claimed is:

1. A deployment method for a booting sequence of multiple operating systems, applied to a baseboard management controller (BMC) and comprising:
    establishing a communication connection to a disk array;
    receiving first target logical disk information, wherein the first target logical disk information is information of logical disks provided with to-be-booted operating systems;
    sending the first target logical disk information to the disk array; and
    receiving booting flag setting information of the disk array, wherein the booting flag setting information is completion information sent after the disk array sets booting flags for corresponding logical disks based on the first target logical disk information;
    the deployment method further comprises:
    acquiring second target logical disk information recommended based on a collaborative filtering algorithm, so that the disk array sets the booting flags for the corresponding logical disks based on the second target logical disk information;
    wherein acquiring the second target logical disk information recommended based on the collaborative filtering algorithm comprises:
    acquiring a system switching frequency and operation time; and
    processing the system switching frequency and the operation time based on a collaborative filtering recommendation algorithm to obtain the second target logical disk information.

2. The deployment method for the booting sequence according to claim 1, wherein the deployment method further comprises:
    adjusting, by a basic input output system (BIOS), the booting sequence of the multiple operating systems based on the booting flags when the BIOS is rebooted.

3. The deployment method for the booting sequence according to claim 2, wherein adjusting, by the BIOS, the booting sequence of the multiple operating systems based on the booting flags when the BIOS is rebooted comprises:
    addressing, by the BIOS, a firmware address of the disk array when the BIOS is rebooted;
    acquiring an automatic flag in a firmware code when addressing is successful; and
    adjusting the booting sequence of the multiple operating systems based on the booting flags.

4. The deployment method for the booting sequence according to claim 3, wherein the deployment method further comprises:
    loading, by a central processing unit (CPU), instructions of the BIOS one by one when the BIOS is rebooted.

5. The deployment method for the booting sequence according to claim 3, wherein addressing, by the BIOS, the firmware address of the disk array comprises:
    addressing, by the BIOS, a read-only memory (ROM) address of the disk array on a bus.

6. The deployment method for the booting sequence according to claim 1, wherein the deployment method further comprises:
    adjusting, by a BIOS, the booting sequence of the multiple operating systems based on the booting flags during a booting process.

7. The deployment method for the booting sequence according to claim 1, wherein establishing the communication connection to the disk array comprises:
    determining, by the BMC, whether a firmware system of the disk array has completed loading when a BIOS has completed loading; and
    in response to that the firmware system of the disk array has completed loading, establishing, by the BMC, the communication connection to the disk array.

8. The deployment method for the booting sequence according to claim 7, wherein the deployment method further comprises:
    determining that the BIOS has completed loading when the BIOS has completed self-test.

9. The deployment method for the booting sequence according to claim 7, wherein after establishing, by the BMC, the communication connection to the disk array, the deployment method further comprises:
    acquiring, by the BMC, information of the disk array, physical disk information, and logical disk information; and
    displaying an operation interface according to the information of the disk array, the physical disk information, and the logical disk information, and acquiring a logical unit number (LUN) of each logical disk, so that a user inputs the first target logical disk information based on a display content of the operation interface.

10. The deployment method for the booting sequence according to claim 1, wherein acquiring the second target logical disk information recommended based on the collaborative filtering algorithm comprises:

in response to that an automatic system switching function of the BMC is enabled, acquiring the second target logical disk information recommended based on the collaborative filtering algorithm.

11. The deployment method for the booting sequence according to claim 1, wherein systems to be booted next time are installed in the logical disks corresponding to the first target logical disk information.

12. The deployment method for the booting sequence according to claim 1, wherein the booting flags are used to illustrate that a system of a current logical disk is a logical disk to be booted next time.

13. The deployment method for the booting sequence according to claim 1, wherein the second target logical disk information is logical disk information corresponding to a switched target operating system.

14. The deployment method for the booting sequence according to claim 1, wherein the deployment method further comprises:
in response to that an automatic system switching function of the BMC is enabled, acquiring a switching frequency and a switching time period for switching to a target operating system within a preset time period; and
generating a recommendation index of the target operating system at a target time node based on a system type of the target operating system, the switching frequency, and the switching time period.

15. The deployment method for the booting sequence according to claim 14, wherein generating the recommendation index of the target operating system at the target time node based on the system type of the target operating system, the switching frequency, and the switching time period comprises:
generating a three-dimensional matrix based on the system type of the target operating system, the switching frequency, and the switching time period; and
calculating the three-dimensional matrix through the collaborative filtering algorithm to obtain the recommendation index of the target operating system at the target time node.

16. A deployment method for a booting sequence of multiple operating systems, applied to a disk array and comprising:
establishing a communication connection to a baseboard management controller (BMC);
receiving first target logical disk information sent by the BMC, wherein the first target logical disk information is information of logical disks provided with to-be-booted operating systems; and
setting booting flags for corresponding logical disks based on the first target logical disk information, and sending booting flag setting information to the BMC;
the deployment method further comprises:
acquiring, by using the BMC, second target logical disk information recommended based on a collaborative filtering algorithm, so that the disk array sets the booting flags for the corresponding logical disks based on the second target logical disk information;
wherein acquiring, by using the BMC, the second target logical disk information recommended based on the collaborative filtering algorithm comprises:
acquiring a system switching frequency and operation time; and
processing the system switching frequency and the operation time based on a collaborative filtering recommendation algorithm to obtain the second target logical disk information.

17. A terminal device, comprising:
a memory, configured to store a computer program; and
a processor, configured to implement, when executing the computer program, the steps of the deployment method for the booting sequence according to claim 1.

18. A non-transitory readable storage medium storing a computer program, wherein the computer program, when executed by a processor, implements the steps of the deployment method for the booting sequence according to claim 1.

* * * * *